W. I. HALDEMAN.
CHICKEN DISINFECTING DEVICE.
APPLICATION FILED NOV. 19, 1915.
1,183,642.
Patented May 16, 1916.
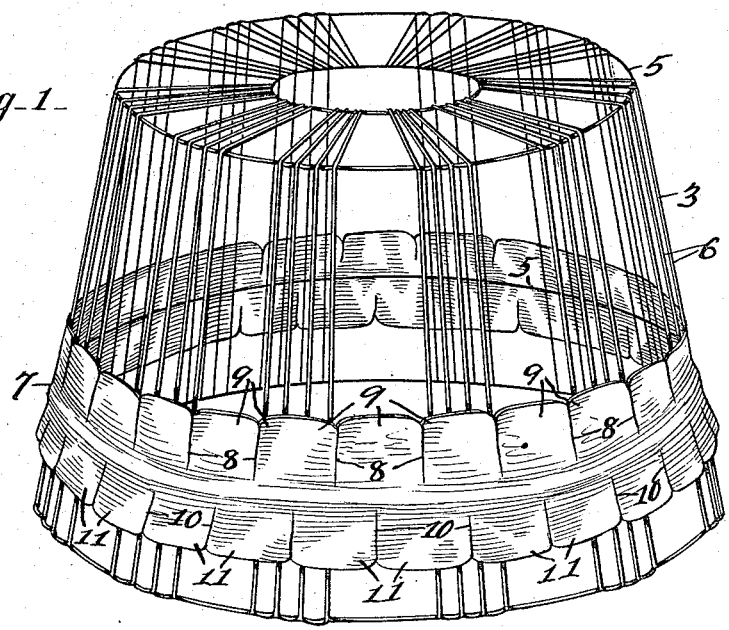
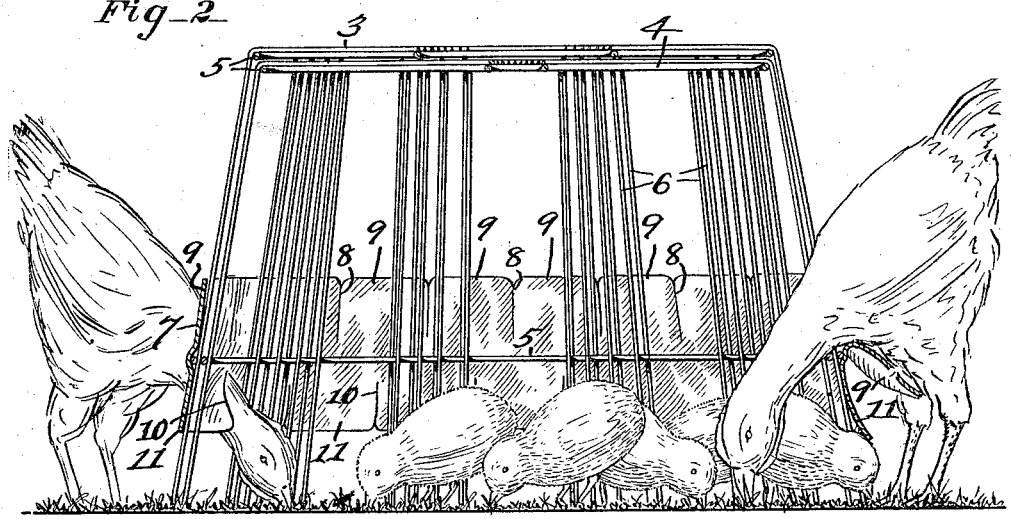
WITNESSES
Frank C. Palmer
J. E. Larsen
INVENTOR
W. I. Haldeman
BY
ATTORNEYS

UNITED STATES PATENT OFFICE.

WILLIAM I. HALDEMAN, OF PINE GROVE, PENNSYLVANIA.

CHICKEN-DISINFECTING DEVICE.

1,183,642.   Specification of Letters Patent.   Patented May 16, 1916.

Original application filed June 24, 1915, Serial No. 36,065. Divided and this application filed November 19, 1915. Serial No. 62,336.

*To all whom it may concern:*

Be it known that I, WILLIAM I. HALDEMAN, a citizen of the United States, and a resident of Pine Grove, in the county of Schuylkill and State of Pennsylvania, have invented certain new and useful Improvements in Chicken-Disinfecting Devices, of which the following is a specification.

My invention relates to the care of chickens and other fowl, and the main object thereof is to provide means for automatically disinfecting the chickens while feeding or, for chicks, while running into and out of a coop.

My invention is illustrated in my application for Letters Patent of the United States filed June 24, 1915, allowed October 12, 1915, Serial No. 36,065, and is based upon matter divided out of said application.

My invention is fully described in the following specification, of which the accompanying drawings form a part, in which like characters refer to like parts in each of the views, and in which:—

Figure 1 is a perspective view of a chicken coop provided with my invention; and Fig. 2 is a sectional view thereof, showing chicks and chickens, and the manner of automatically disinfecting the same.

In the drawings forming a part of this application I have shown a chicken coop formed of two nested members 3 and 4 consisting, each, of horizontal rings 5 and bars 6, but the particular type of coop is of no importance as my invention is applicable to different types of coops.

The invention consists of a band 7 of suitable material, such as burlap or the like, vertically slitted at 8 at equidistant points for slightly less than half the height of the band to form flaps 9, and similarly slitted at 10 to form flaps 11, the band being arranged at a slight distance above the surface upon which the coop rests. The band is saturated with a suitable disinfectant, such as coal oil and lard, a solution of carbolic acid, etc., but not in sufficient quantity to drip from the band. The flaps 11 are arranged at a less height above the ground than the height of chicks, whereby when the latter pass into and out of the coop their heads and backs are brushed by the flaps 11 and the disinfecting solution is transmitted to their bodies, thereby keeping them free from insects or vermin but not interfering with their movements in the least. Chickens of a larger growth may have the disinfectant transmitted to their heads and necks while reaching under the band, as in feeding, or their necks and breasts may be disinfected while reaching over the band, the flaps 9 yielding to pressure but being maintained in bodily contact with the chickens. The bands 7 will be very inexpensive in order that they may be frequently replaced, but I may make the same of more expensive and more permanent material which may be repeatedly saturated with the disinfecting solution, this being optional with me, and I may make the same of any size and of any form to adapt the same to the particular coop upon which they are to be used.

Having fully described my invention, what I claim as new, and desire to secure by Letters Patent, is:—

1. As an article of manufacture, for use on a chicken coop, a band of absorbent material provided with spaced slits along the upper edge thereof to form flaps.

2. As an article of manufacture, for use on a chicken coop, a band of absorbent material having flaps formed along both upper and lower edges, the flaps on the upper edge being staggered with respect to the flaps of the lower edge to avoid weakening the band between the inner ends of adjacent slits forming the flaps.

In testimony whereof I have signed my name to this specification in the presence of two subscribing witnesses.

WILLIAM I. HALDEMAN.

Witnesses:
JOHN W. BARTO,
J. WILSON BARTO.

Copies of this patent may be obtained for five cents each, by addressing the "Commissioner of Patents, Washington, D. C."